US012811802B2

(12) United States Patent
Ozturk et al.

(10) Patent No.: US 12,811,802 B2
(45) Date of Patent: Nov. 24, 2026

(54) MOBILE ELECTRONIC SIGNATURE SYSTEM

(71) Applicant: CLOUDPEER GLOBAL TEKNOLOJI A. S., Istanbul (TR)

(72) Inventors: Gurkan Ozturk, Istanbul (TR); Murat Sen, Istanbul (TR)

(73) Assignee: CLOUDPEER GLOBAL TEKNOLOJI A. S., Istanbul (TR)

( * ) Notice: Subject to any disclaimer, the term of this patent is extended or adjusted under 35 U.S.C. 154(b) by 78 days.

(21) Appl. No.: 18/725,816

(22) PCT Filed: Dec. 30, 2021

(86) PCT No.: PCT/TR2021/051641
§ 371 (c)(1),
(2) Date: Jul. 1, 2024

(87) PCT Pub. No.: WO2023/128908
PCT Pub. Date: Jul. 6, 2023

(65) Prior Publication Data
US 2025/0070984 A1 Feb. 27, 2025

(51) Int. Cl.
*H04L 29/06* (2006.01)
*H04L 9/32* (2006.01)

(52) U.S. Cl.
CPC .......... *H04L 9/3247* (2013.01); *H04L 9/3263* (2013.01)

(58) Field of Classification Search
CPC ... H04L 9/3247; H04L 9/3263; H04L 9/0825; H04L 9/3249; H04L 9/3252; H04L 9/3268; H04L 9/32; H04L 63/12; G06Q 10/10; G06Q 30/018; G06Q 50/18; G06Q 2220/00; G06Q 20/40; H04M 2215/0156; H04N 2201/3233; H04N 1/32771; H04N 1/4446; G06F 7/4824; G05B 2219/14074;
(Continued)

(56) References Cited

U.S. PATENT DOCUMENTS

| | | | |
|---|---|---|---|
| 10,277,400 | B1 | 4/2019 | Griffin et al. |
| 2001/0002485 | A1 | 5/2001 | Bisbee et al. |

(Continued)

*Primary Examiner* — Edward Zee
*Assistant Examiner* — Leynna Truvan
(74) *Attorney, Agent, or Firm* — Bayramoglu Law Offices LLC

(57) ABSTRACT

A mobile electronic signature system is provided. The mobile electronic signature system includes a first client device with a mobile application installed; a signature server providing an electronic signature transmitted to the mobile application; a second client device to which an electronic document is sent; a signature server configured to be sent with the creation of a signature file in the first client device, providing electronic certificate compliant identity verification on the signature server, accessing one or more signature circuits containing electronic signature authorizations compliant with signature certificates registered in a server memory unit, querying the electronic signature authorization in the signature file, and providing a verification process for changes made by adding an electronic signature by comparing the electronic document and the signed electronic document; the second client device is configured to receive a mobile service by sending the signature file through the signature server.

17 Claims, 1 Drawing Sheet

(58) Field of Classification Search
CPC ........... G05B 2219/25423; G07B 2017/00766; G11B 20/00862; G07C 2009/00388; G06V 30/00; G06V 30/1448; G06V 30/40; G06V 40/33; G06V 40/37
See application file for complete search history.

(56) References Cited

U.S. PATENT DOCUMENTS

| | | | | |
|---|---|---|---|---|
| 2007/0208944 | A1 | 9/2007 | Pavlicic | |
| 2010/0169651 | A1 | 7/2010 | Scheidt et al. | |
| 2016/0048696 | A1* | 2/2016 | Follis | G06F 21/645<br>726/28 |
| 2019/0097811 | A1* | 3/2019 | Devoret | H04L 9/3297 |
| 2020/0280444 | A1 | 9/2020 | Tang et al. | |
| 2021/0312561 | A1 | 10/2021 | Speasl et al. | |

* cited by examiner

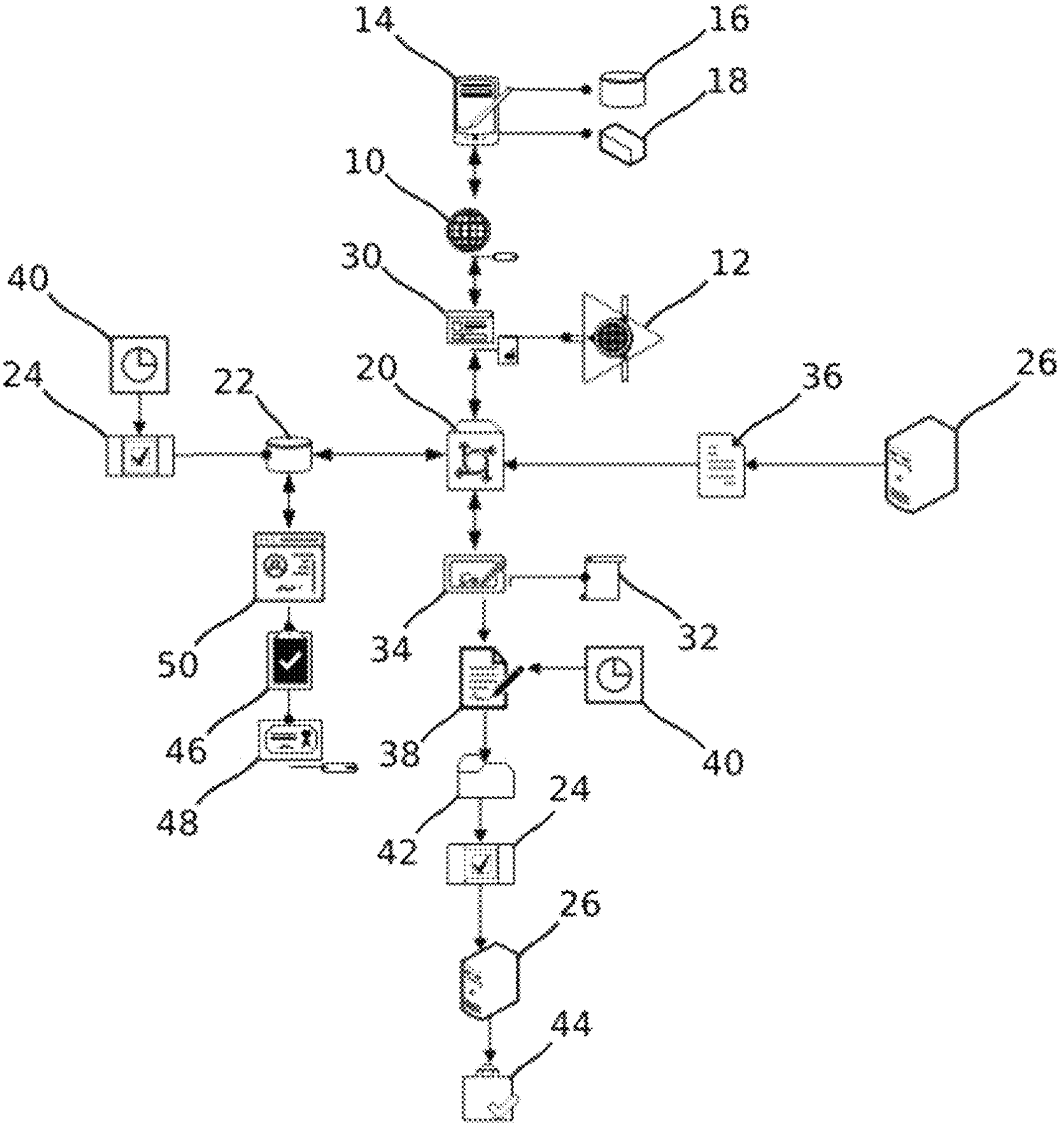
14
16
18
10
30
12
40
24
22
20
36
26
50
34
32
46
38
40
48
42
24
26
44

MOBILE ELECTRONIC SIGNATURE SYSTEM

CROSS-REFERENCE TO THE RELATED APPLICATIONS

This application is the national phase entry of International Application No. PCT/TR2021/051641, filed on Dec. 30, 2021, the entire contents of which are incorporated herein by reference.

TECHNICAL FIELD

The invention relates to a mobile electronic signature system that enables the electronic signing of electronic documents in service systems.

BACKGROUND

In the literature, electronic signatures (e-Signatures) are secure electronic signatures created based on a Qualified Electronic Certificate (QEC). Electronic signatures are used in mobile devices, and banking transactions, other financial applications, various applications, and transactions made to public institutions, electronic correspondence and contracts, electronic communications, insurance transactions, and corporate resource planning applications. In this context, applications are being developed to provide electronic signatures in mobile devices through mobile applications. In the literature, developments can be made for determining the suitability of the service by creating an electronic document in the banking service with the provision of electronic signatures in mobile banking systems, making the electronic signature available in the mobile application, and examining the document in the system's infrastructure of the mobile application.

TW201947497A relates to a financial services application system comprising: an electronic application signature device for filling in e-form and signing the e-signature, a counter terminal, coupling with the electronic application signature device for transmitting e-form and financial services information required for financial services application, and, system server, coupling with the counter terminal for controlling the operation of the financial services application system.

SUMMARY

The object of the invention is to develop an electronic signature system that can be run as a mobile device application, at least partially reducing users' needs such as installing software on their mobile devices, connecting signature hardware to their mobile devices to sign electronic documents.

In order to achieve the above objectives, the invention relates to a mobile electronic signature system comprising a first client device with a mobile application installed, which provides access to one or more service systems via an internet-accessible network server; a signature server that provides an electronic signature containing one or more electronic certificates transmitted to the mobile application when the first client device accesses the service system; a second client device that receives an electronic document transmitted from the signature server to the first client device; the signature server configured to send a signed electronic document and a time stamp containing the electronic certificate when an electronic signature is added to the electronic document in the first client device, characterized in that the signature server configured to verify a signature file from the first client device to provide appropriate identity verification according to the electronic certificate, and queries the electronic signature authority in the signature file by accessing one or more signature circuits containing electronic signature permissions suitable for signature certificates recorded in a server memory unit, and conduct a verification process that provides a query about the changes made with the addition of the electronic signature by comparing the electronic document with the signed electronic document; the second client device includes a mobile service is configured to send the signature file through the signature server upon determining the success at the verification process. As a result, an electronic signature is provided in a mobile system as a mobile device application where the signing of electronic documents is done in an electronic environment. In addition, an electronic signature system with increased security against malicious third parties in service services through controls in the verification process on the signature server is also provided by at least partially reducing the need for intermediate hardware and software in signing electronic documents and facilitating document signing on the mobile system. Here, the first client device can be, for example, a mobile device used by a bank customer; while the second client device can be a service provider like a bank.

In a preferred embodiment of the invention, the first client device is a mobile device having a mobile memory unit and a processing unit connected to provide bidirectional data flow with the mobile memory unit. As a result, the processor unit of the first client device is enabled to receive an electronic document and, when receiving a signing command on the device, modify the electronic document to include the electronic signature, thus creating a signed electronic document.

In a preferred embodiment of the invention, the mobile memory unit is configured to store electronic certificates received from the signature server in the first client device. This way, the certificate data received on the first client device can be stored and retained.

In a preferred embodiment of the invention, the processing unit is configured to enable the reading and writing of data in the mobile memory unit. As a result, it becomes possible for the first client device to add a timestamp to the signed electronic document containing the electronic certificate and to create a signature file, which can then be sent to the signature server.

In a preferred embodiment of the invention, the second client device is a system server device that provides the service system and sends the electronic document. In this way, the second client device can act as a server for the service, providing an electronic document to the first client device through the signature server, and upon determining the compliance of the signature file received from the first client device during the verification process, the desired mobile service can be obtained by sending it to the second client device. In this case, for example, a bank's financial service can be accessed from the second client device, and the bank's financial services can be displayed in the service areas within the mobile application.

In a preferred embodiment of the invention, the verification process is configured to be recorded in the server memory unit, including a time stamp. In this way, if an error or inconsistency occurs in the processes carried out on the signature server, the analysis of the recorded verification process can be performed.

In a preferred embodiment of the invention, the second client device comprises a system memory unit configured to store one or more electronic signatures containing electronic certificates. In this way, when it is necessary to have signatures from both parties, the second client device can perform the processes carried out by the first client device and send the signed document back to the first client device.

BRIEF DESCRIPTION OF THE DRAWINGS

The FIGURE is a schematic illustration of a mobile electronic signature system according to the subject matter invention.

DETAILED DESCRIPTION OF THE EMBODIMENTS

In this detailed explanation, the invention is explained without any limitation and only with reference to examples to better explain the subject matter.

The FIGURE schematically shows the subject matter of a mobile electronic signature system. In the mobile electronic signature system, the developed electronic signature system can be used by providing access to banking services from mobile devices. The mobile electronic signature system has a first client device (14) as a user. Here, the first client device (14) can be a mobile device, for example, a smartphone of a user who wants to access banking services. A mobile memory unit (16) and a processor unit (18) are interconnected to provide data flow on the first client device (14). In the mobile memory unit (16), incoming data, such as electronic certificates (32) received from a signature server (20), are stored in a manner that retains them. The processor unit (18) enables the reading and writing of data stored in the mobile memory unit (16). In this way, changes or adjustments can be made to the data. For example, a time stamp (40) can be added to the signed electronic document (38) containing an electronic certificate (32) on the first client device (14), and a signature file (42) can be created and sent to the signature server (20). The first client device (14) has a mobile application (30) installed, which provides access to the mobile electronic signature system of the invention. Here, the first client device (14) accesses one or more service systems (12) through an internet-enabled network server (10) with the mobile application (30). The service system (12) can be, for example, the system of banking services provided, and the first client device (14) can use these services in a service area. With the access of the first client device (14) to the service system (12) via the mobile application (30), at least one electronic signature (34) is transmitted from the signature server (20) to the device (14). An electronic signature (34) can contain one or more electronic certificates (32). Here, an electronic document (36) sent from a second client device (26) is transmitted to the first client device (14) via the signature server (20). The signature server (20) is a hardware server that provides the mobile infrastructure for the system of the invention. The signature server (20) includes a server memory unit (22) where one or more signature circuits (50) are registered. Access is provided to signature *circulars* (50) containing electronic signature permissions (46) suitable for signature certificates (48) registered in the server memory unit (22). The electronic document (36) can be, for example, a document in PDF format. In addition, the electronic document (36) can also be a bank instruction form, for example. Here, the second client device (26) is also a system server device where the service system (12) is provided. For example, the second client device (26) can be a system server of a bank finance system. The second client device (26) includes a system memory unit (28) where one or more electronic signatures (34) containing an electronic certificate (32) are stored. A signed electronic document (38) is created by adding the electronic signature (34) provided by the signature server (20) to the electronic document (36) received from the second client device (26) via the signature server (20) in the first client device (14). A signature file (42) is provided by adding a timestamp (40) to the signed electronic document (38) and includes the electronic certificate (32) provided with the electronic signature (34). The signature file (42) created in the interface of the mobile application (30) in the first client device (14) is sent to the second client device (26) through the mobile electronic signature system of the invention, but the signature file (42) first comes to the signature server (20) where content checks are performed. A verification process (24) is performed to ensure the content checks of the signature file (42) arrive at the signature server (20). During the verification process (24), identity checks are made to determine whether the signature file (42) is suitable for the electronic certificate (32), and if the accuracy is determined, identity approval is given. In addition, access is provided to signature *circulars* (50) recorded in the server memory unit (22), the electronic signature authority (46) in the signature file (42) is queried, and the validity of the electronic signature authority (46) is ensured if suitability is determined at the end of the query. Furthermore, a comparison is made between the electronic document (36) and the signed electronic document (38), for example, whether it is different from the original document or whether a change has been made in the electronic document (36) with the addition of the electronic signature (34), and if a specified error is not detected, the suitability of the verification process (24) is ensured, and the signature file (42) is sent from the signature server (20) to the second client device (26). Here, the verification process (24) is recorded in the server memory unit (22) of the signature server (20) with a time stamp. Thus, if an error or inconsistency occurs in the processes performed on the signature server (20), the recorded verification process (24) can be reviewed. For example, the security of the service in the mobile electronic signature system of the invention with the control of the signature server (20) in banking services is increased. When the signature file (42), whose suitability is determined in the verification process (24), reaches the second client device (26), a mobile service (44) is provided, and the desired service purchase on the system is completed.

| REFERENCE NUMBERS | |
|---|---|
| 10 Network server | 32 Electronic certificate |
| 12 Service system | 34 Electronic signature |
| 14 First client device | 36 Electronic document |
| 16 mobile memory unit | 38 Signed electronic document |
| 18 Processor unit | 40 Timestamp |
| 20 Signature server | 42 Signature file |
| 22 Server memory unit | 44 Mobile service |
| 24 Confirmation process | 46 Electronic signature authorization |
| 26 Second client device | 48 Signing certificate |
| 28 System memory unit | 50 Signature circular |
| 30 Mobile application | |

What is claimed is:

1. A mobile electronic signature system, comprising a first client device with a mobile application installed, wherein the mobile application provides an access to at least one service system via an internet-accessible network server;

a signature server, wherein the signature server provides an electronic signature containing at least one electronic certificate transmitted to the mobile application when the first client device accesses the service system; and a second client device, wherein the second client device receives an electronic document transmitted from the signature server to the first client device;

wherein the signature server is configured to send a signed electronic document and a time stamp containing the electronic certificate when the electronic signature is added to the electronic document in the first client device, wherein the signature server is configured to verify a signature file from the first client device to provide an appropriate identity verification on according to the electronic certificate, and the signature server queries an electronic signature authority in the signature file by accessing at least one signature circuit containing electronic signature permissions suitable for signature certificates recorded in a server memory unit, and the signature server conducts a verification process, wherein the verification process provides a query about changes made with an addition of the electronic signature by comparing the electronic document with the signed electronic document; the second client device comprises a mobile service and is configured to send the signature file through the signature server upon determining a success at the verification process; wherein the second client device is a system server device providing the service system and sends the electronic document; and wherein the second client device comprises a system memory unit configured to store the electronic signature containing the electronic certificates; and wherein the signature file is created in an interface of the mobile application in the first client device by adding the time stamp to the signed electronic document, the signature file including the electronic certificate provided with the electronic signature; wherein the signature file is transmitted from the first client device to the signature server for the verification process; wherein, during the verification process, the signature server performs content checks on the signature file, accesses one or more signature circuits recorded in the server memory unit, queries and validates the electronic signature authority in the signature file, and compares the electronic document with the signed electronic document; and wherein the success at the verification process is determined only when the signature server determines that the signature file is suitable for the electronic certificate and that no specified error is detected from the comparison, and the mobile service is provided.

2. The mobile electronic signature system according to claim 1, wherein the first client device is a mobile device having a mobile memory unit and a processing unit connected to provide bidirectional data flow with the mobile memory unit.

3. The mobile electronic signature system according to claim 2, wherein the mobile memory unit is configured to store the electronic certificates received from the signature server in the first client device.

4. The mobile electronic signature system according to claim 3, wherein the second client device is a system server device providing the service system and sends the electronic document.

5. The mobile electronic signature system according to claim 4, wherein the verification process is configured to be recorded in the server memory unit, comprising a timestamp.

6. The mobile electronic signature system according to claim 4, wherein the second client device comprises a system memory unit configured to store the electronic signature containing the electronic certificates.

7. The mobile electronic signature system according to claim 3, wherein the verification process is configured to be recorded in the server memory unit, comprising a timestamp.

8. The mobile electronic signature system according to claim 2, wherein the processing unit is configured to enable reading and writing of data in the mobile memory unit.

9. The mobile electronic signature system according to claim 8, wherein the second client device is a system server device providing the service system and sends the electronic document.

10. The mobile electronic signature system according to claim 9, wherein the verification process is configured to be recorded in the server memory unit, comprising a timestamp.

11. The mobile electronic signature system according to claim 9, wherein the second client device comprises a system memory unit configured to store the electronic signature containing the electronic certificates.

12. The mobile electronic signature system according to claim 8, wherein the verification process is configured to be recorded in the server memory unit, comprising a timestamp.

13. The mobile electronic signature system according to claim 2, wherein the second client device is a system server device providing the service system and sends the electronic document.

14. The mobile electronic signature system according to claim 13, wherein the verification process is configured to be recorded in the server memory unit, comprising a timestamp.

15. The mobile electronic signature system according to claim 13, wherein the second client device comprises a system memory unit configured to store the electronic signature containing the electronic certificates.

16. The mobile electronic signature system according to claim 2, wherein the verification process is configured to be recorded in the server memory unit, comprising a timestamp.

17. The mobile electronic signature system according to claim 1, wherein the verification process is configured to be recorded in the server memory unit, comprising a timestamp.

* * * * *